W. Pearson,
Clamp Nut.

N° 80,997.    Patented Aug. 11, 1868.

Witnesses:
A. Leclere
A. Kinner

Inventor:
Wm Pearson

UNITED STATES PATENT OFFICE.

WILLIAM PEARSON, OF WINDSOR LOCKS, CONNECTICUT.

IMPROVEMENT IN CLAMP-NUTS.

Specification forming part of Letters Patent No. 80,997, dated August 11, 1868.

*To all whom it may concern:*

Be it known that I, WILLIAM PEARSON, of Windsor Locks, in the county of Hartford and State of Connecticut, have invented a new and Improved Mode of Providing for the Disengagement of Nuts from the Screws of Clamps and other Articles; and I do hereby declare that the following is a full, clear, and exact description of the same, reference being had to the accompanying drawings, forming a part of this specification, in which—

Figure 1:
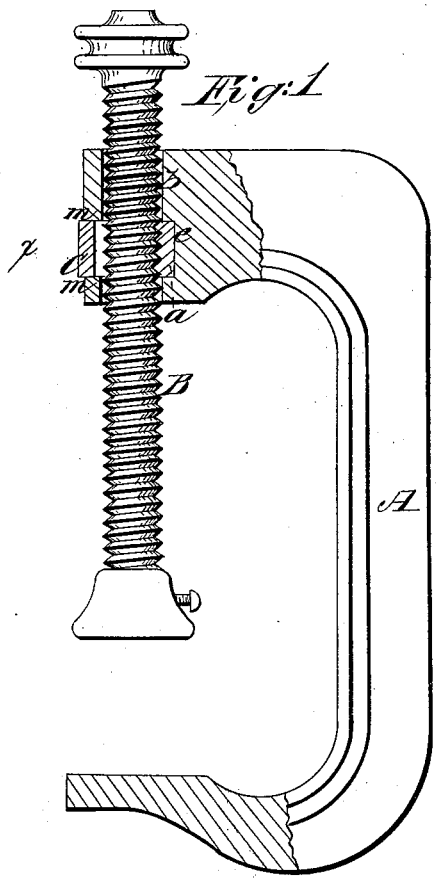
Figure 2:
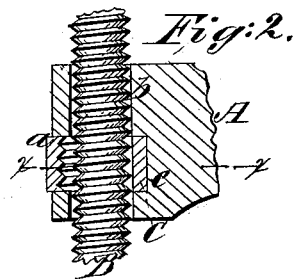
Figure 3:
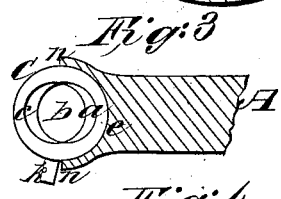
Figure 4:
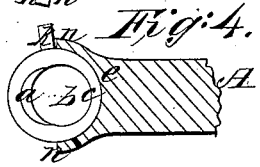
Figure 5:
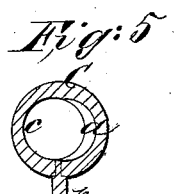
Figure 6:
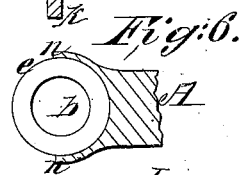

Figure 1 represents a side view of a screw-clamp having my invention applied, the nut and its bearing being shown in section, and the nut represented in gear with the screw. Fig. 2 represents the upper portion of the clamp in section, with the nut out of gear. Fig. 3 represents a transverse section of the nut and its bearing in the line $x\,x$, and illustrating the nut in gear. Fig. 4 is a similar section, illustrating the nut out of gear. Fig. 5 is a cross-section of the nut, and Fig. 6 a cross-section of the bearing.

Similar letters of reference indicate corresponding parts in the several figures.

This invention consists in a novel construction and arrangement of a mutilated nut and of a bearing provided for the same, in a screw-clamp or other article, whereby the nut may be thrown in or out of gear with its screw by simply turning it a certain distance in its bearing, the object being to provide for the running of the screw rapidly back or forward through the nut, or vice versa, whenever desired, and thereby expediting the adjustment of the screw.

In order that others may be better enabled to understand the construction and operation of my invention, I will proceed to describe its application to a screw-clamp with reference to the drawings.

A is the frame of the clamp, made substantially of the usual form; but instead of having a screw-thread tapped in the jaw which receives the screw B, it has bored through the said jaw, lengthwise of the clamp, a cylindrical hole, $b$, of such diameter that the screw may just glide freely through it in a longitudinal direction; and the said jaw has a transverse mortise, $m$, provided in it, for the reception of the nut C, the exterior of which is of circular form. The back of this mortise $m$ is made of circular form, corresponding with the exterior of the nut, to constitute a bearing for the same, and this bearing $e$ is made eccentric to the hole $b$, the degree of extent of its eccentricity being equal to the depth of the thread of the screw.

The nut C has its threaded opening $a$ eccentric to its circular exterior to the extent of the depth of the screw-thread; and on that side of the said threaded opening which is opposite to the direction of its eccentricity the screw-thread is mutilated or removed by forming a circular cavity, $c$, of a diameter of the exterior of the thread of the screw B, the circle of said cavity being eccentric to the circular exterior of the nut in the same degree as the tapped opening, but in the opposite direction, as shown in Fig. 5. At its junction with the said cavity the thread of the nut is cut away to a slight extent, to facilitate its passing into gear with and out of gear from the screw. The nut has a projection or knob, $k$, on its exterior, which, when the nut is in place, protrudes from the front of mortise in the jaw of the clamp, and enables it to be turned easily by the thumb and fingers.

When the nut is in place, and the screw has been inserted through it and the jaw of the clamp, the screw always remains concentric with the hole $b$, and consequently eccentric to the bearing $e$, and the exterior of the nut is concentric to the said bearing. By turning the nut to one position, the screw-thread, in its interior, is brought concentric with the screw B, and into gear therewith, so that it works like a screw in an ordinary nut; and by turning the nut to another position, the cavity is brought concentric with the screw, and consequently the screw is allowed to pass freely through the nut in a longitudinal direction without being turned.

The two positions above mentioned, and the limit of the movement of the nut to change it from one position to the other, are regulated by the knob $k$, which is stopped in one or the other position by coming in contact with one or other of the two shoulders $n\ n'$ at the ends of the mortise $m$.

This invention is applicable to lathe-screws and all screw appliances in which the rapid running back of screws and nuts is a consideration.

What I claim as my invention, and desire to secure by Letters Patent, is—

The eccentric mutilated nut C and eccentric bearing, in combination with a screw, substantially as herein described.

WM. PEARSON.

Witnesses:
 A. LE CLERC,
 A. KINNIER.